US008878391B2

(12) United States Patent
Taylor

(10) Patent No.: US 8,878,391 B2
(45) Date of Patent: Nov. 4, 2014

(54) SYSTEM, APPARATUS, AND METHOD FOR REDUCING INRUSH CURRENT IN A THREE-PHASE TRANSFORMER

(75) Inventor: Douglas I. Taylor, Moscow, ID (US)

(73) Assignee: Schweitzer Engineering Laboratories, Inc, Pullman, WA (US)

( * ) Notice: Subject to any disclaimer, the term of this patent is extended or adjusted under 35 U.S.C. 154(b) by 523 days.

(21) Appl. No.: 13/347,563

(22) Filed: Jan. 10, 2012

(65) Prior Publication Data

US 2013/0175879 A1 Jul. 11, 2013

(51) Int. Cl.
*H01F 13/00* (2006.01)
(52) U.S. Cl.
USPC .......................................... 307/101
(58) Field of Classification Search
USPC .......................................... 307/101
See application file for complete search history.

(56) References Cited

U.S. PATENT DOCUMENTS

| | | | |
|---|---|---|---|
| 4,757,263 | A | 7/1988 | Cummings |
| 4,914,382 | A | 4/1990 | Douville |
| 5,430,599 | A | 7/1995 | Charpentier |
| 5,627,415 | A | 5/1997 | Charpentier |
| 5,703,745 | A | 12/1997 | Roberts |
| 6,028,754 | A | 2/2000 | Guzman |
| 6,865,063 | B2 | 3/2005 | Ball |
| 6,919,717 | B2 | 7/2005 | Ghassemi |
| 7,880,343 | B2 | 2/2011 | Kleinecke |
| 8,310,106 | B2 | 11/2012 | Koshiduka |
| 2004/0090726 | A1 | 5/2004 | Ball |
| 2009/0251009 | A1 | 10/2009 | Kleinecke |
| 2010/0141236 | A1 | 6/2010 | Koshiduka |

OTHER PUBLICATIONS

J. Brunke, Elimination of Transient Inrush Currents When Energizing Unloaded Power Transformers, Ph.D dissertation, ETH Swiss Federal Institute of Technology, Zurich, Switzerland, 1998.
J. H. Brunke and K. J. Frohlich, Elimination of Transformer Inrush Currents by Controlled Switching, Part II, IEEE Transactions on Power Delivery, vol. 16, No. 2, pp. 281-285, Apr. 2002.
J. H. Brunke and K. J. Frohlich, Elimination of Transformer Inrush Currents by Controlled Switching, IEEE Electric Power Systems Research-Selected Topics in Power System Transients, pp. 642-649, May 2006.

(Continued)

*Primary Examiner* — Robert L. Deberadinis
(74) *Attorney, Agent, or Firm* — Richard M. Edge

(57) ABSTRACT

A system for reducing inrush current in a three phase utility transformer upon energization of the transformer by an applied three phase voltage utilizes a pre-flux circuit for establishing residual flux levels in the core segments of the primary windings of the transformer which are near the prospective flux levels established in the core segments by the applied voltage. The pre-flux circuit includes a pre-fluxing capacitor which, after being charged to a predetermined voltage level, is discharged serially through two of the primary windings to establish the predetermined flux levels in the core segments of the two windings, and a reduced flux level in the core segment of the remaining primary winding. The transformer is energized at the instant of positively-referenced peak phase voltage to the third primary winding such that prospective and residual flux approach a near-equal level in all three core segments and inrush current is reduced. The method may be applied to the secondary or tertiary windings instead of the primary windings. Additionally, an alternative method allows application of the pre-fluxing circuit to a delta-connected set of transformer windings.

22 Claims, 12 Drawing Sheets

(56) References Cited

OTHER PUBLICATIONS

A. Mercier, E. Portales, Y. Filion, and A. Salibi, Transformer Control Switching Taking into Account the Core Residual Flux—a Real Case Study, Paper No. 13-201, Cigre 2002 Session, Paris, France.

E. Portales, and Q. Bui-Van, New Control Strategy of Inrush Transient During Transformer Energization at Toulnustouc Hydropower Plant Using a Double-Break 330 kV Circuit Breaker, IPST 2003, New Orleans, USA.

Cigre WG 13.07, Controlled Switching of Unloaded Power Transformers, Electra, No. 212, pp. 39-47, Feb. 2004.

M. Steurer and K. Frohlich, The impact of inrush currents on the mechanical stress of high voltage power transformer coils, IEEE Transactions on Power Delivery, vol. 17, No. 1, pp. 155-160, Jan. 2002.

F. Ghassemi and P. Gale, Harmonic voltage measurements using CVTs, IEEE Transactions on Power Delivery, vol. 17, No. 4, pp. 915-920, Oct. 2002.

F. Ghassemi and P. Gale, Method to measure CVT transfer function, IEEE Transactions on Power Delivery, vol. 20, No. 1, pp. 443-449, Jan. 2005.

S. Zhao, H. Y. Li, F. Ghassemi, P. Crossley, Impact of power quality sensor technique on power system protection voltage transient measurements, 10th IET International Conference on Developments in Power System Protection, Mar. 2010.

R. Malewski, J. Douville, and L. Lavalee, Measurement of switching transients in 735 kV substations and assessment of their severity for transformer insulation, IEEE Transactions on Power Delivery, vol. 3, No. 4, pp. 1380-1390, Oct. 1988.

Douglas I. Taylor, Single Phase Transformer Inrush Current Reduction Using Pre-Fluxing, A Thesis Presented in Partial Fulfillment of the Requirement for the Degree of Master of Science with a Major in Electrical Engineering in the College of Graduate Studies, University of Idaho, Nov. 13, 2009.

M. J. Heathcote, The J & P Transformer Book, 12th Edition, Elsevier, 1998, pp. 512-513.

S. G. Abdulsalam, W. Xu, A Sequential Phase Energization Method for Transformer Inrush Current Reduction-Transient Performance and Practical Considerations, IEEE Transaction of Power Delivery, vol. 22, No. 1, Jan. 2007, pp. 208-216.

A. Ebner, Determination of Residual Flux for Controlled Transformer Energisation, Power Systems and High Voltage Laboratories Annual Report, 2008, Swiss Federal Institute of Technology, Zurich, Switzerland, pp. 57-61.

V. Molcrette, J.-L. Kotny, J.-P. Swan, J.-F. Brundy, Reduction of Inrush Current in Single-Phase Transformer using Virtual Air Gap Technique, IEEE Transactions on Magnetics, vol. 34, No. 4, pp. 1192-1194, Jul. 1998.

B. Kovan, F. De Leon, D. Czarkowski, Z. Zabar, L. Birenbaum, Mitigation of Inrush Currents in Network Transformers by Reducing the Residual Flux With an Ultra-Low-Frequency Power Source, IEEE Transactions on Power Delivery, vol. 26, No. 3, pp. 1563-1570, Jul. 2011.

Abb, Bushing Potential Device, Type PBA2, Instructions for Installation and Maintenance, Sep. 2003.

D. Goldsworthy, T. Roseburg, D. Tziouvaras, and J. Pope, Controlled Switching of HVAC Circuit Breakers: Application Examples and Benefits, 34th Annual Western Protective Relay Conference Proceedings, Spokane, WA, Oct. 2007.

T. Liu, H. Siguerdidjane, M. Petit, T. Jung, J.P. Dupraz, Reconstitution of Power transformer's Residual Flux with CVT's Measurement During its De-energization, Sep. 8-10, 2010.

PCT/US2012/068922 International Search Report and Written Opinion of the International Searching Authority, Patent Cooperation Treaty, Feb. 22, 2013.

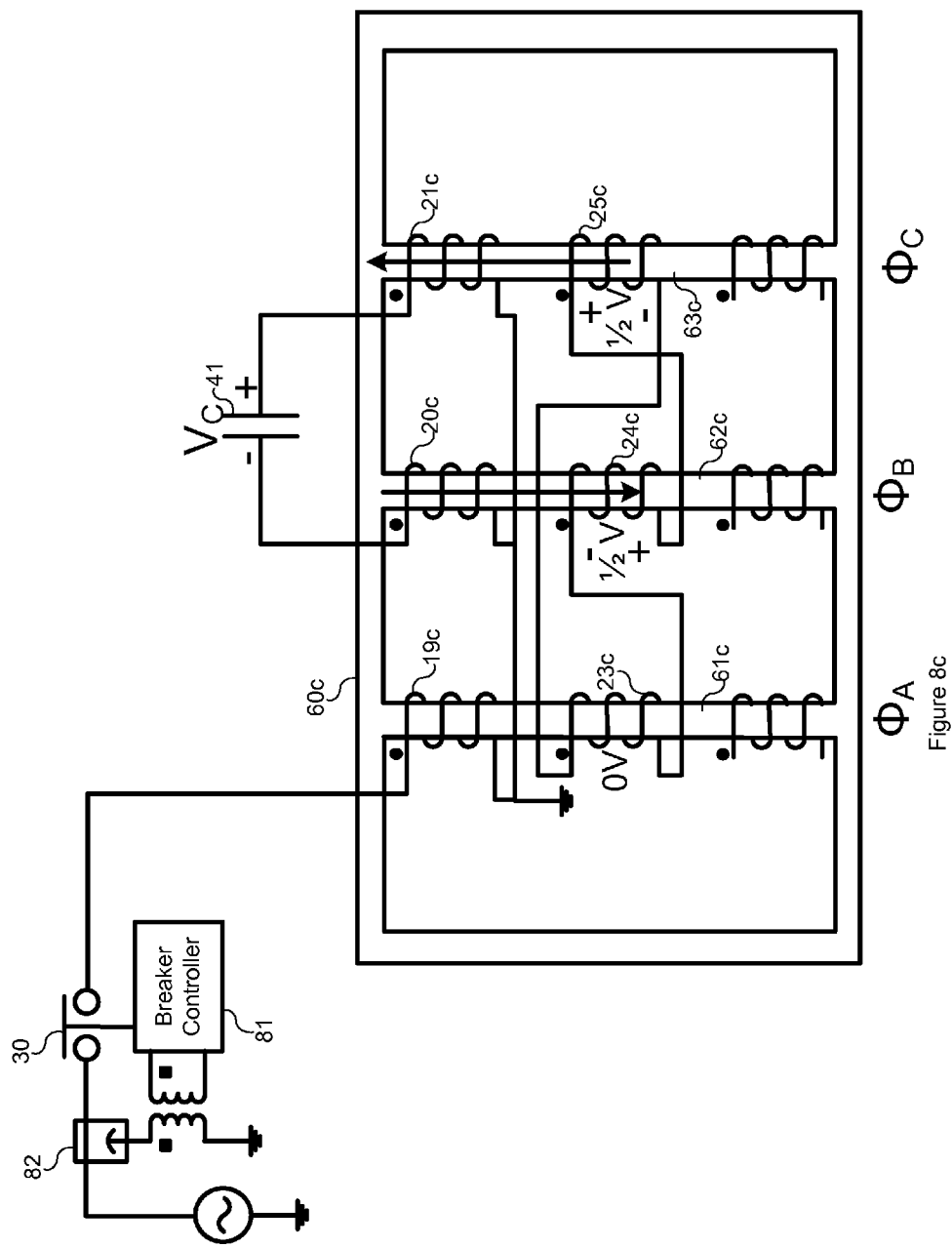

US 8,878,391 B2

SYSTEM, APPARATUS, AND METHOD FOR REDUCING INRUSH CURRENT IN A THREE-PHASE TRANSFORMER

CROSS-REFERENCE TO RELATED APPLICATIONS

None.

BACKGROUND OF THE INVENTION

The present invention relates generally to transformer inrush current reduction, and more specifically, to a system, apparatus, and method for reducing inrush current when energizing a three-phase transformer.

When energizing a three-phase transformer in an electric power delivery system (such as an electric power generation, transmission, or distribution system, or the like), inrush currents may occur which can be as large as ten times the transformer's nominal current and can last for up to around half of a second. The actual magnitude of these inrush currents depends on the impedance of the source supplying the transformer, the residual magnetic flux existing in the transformer, and the angle of the applied voltage at the time of energization.

Such high transformer inrush currents have a number of potentially adverse effects. For one, a high inrush current can significantly heat transformer windings and cause deterioration of insulation in the transformer. In addition, high inrush currents can place large mechanical stresses on the transformer windings sufficient to displace the windings on the transformer core, which, in the worst case, can break electrical connections within the transformer. Moreover, insulation compression from displacement of the transformer windings can result in turn-to-turn faults within the transformer, which, if left undetected, can eventually destroy the transformer.

Large inrush currents can also disrupt a power system by inappropriately tripping circuit breakers and over-current relays, by causing voltage sags which can affect sensitive equipment, by introducing large harmonic components, and by instigating sympathetic inrush currents in adjacent, parallel-connected transformers.

Some prior art inrush current reduction methods which have been previously used or suggested include 1) the use of resistors or other components temporarily switched in series or in parallel with the transformer windings; 2) the use of controlled voltage energization without accounting for the residual flux in the transformer; and 3) the use of controlled voltage energization based on an estimate of the residual flux in the transformer windings.

These prior methods have not been entirely satisfactory for use in power delivery systems because they have either required the temporary interposition of additional components in one of the circuits of the transformer during energization or have required circuit breakers capable of individual phase control with the possible need to measure residual flux levels in the transformer winding, which can be failure-prone or in some cases require significant upgrade of existing equipment.

The present disclosure provides a system, apparatus and method for effectively performing this pre-fluxing operation in a conventional three-phase transformer. In particular, the present disclosure is directed to a system, apparatus and method for establishing pre-flux levels in the three core segments associated with the transformer primary windings of a three-phase transformer such that when the windings are energized at the correct instant significantly reduced inrush current results. The system is automatic, requiring only user actuation prior to energization of the transformer.

Objects of the Invention

Accordingly, it is a general object of the present disclosure to reduce transformer inrush current in a three-phase power system.

It is a more specific object of the present disclosure to provide a system, apparatus and method for automatically establishing residual flux levels in the transformer's core segments such that the transformer can be energized with reduced inrush current in the windings.

It is a still more specific object of the present disclosure to provide a system, apparatus and method for establishing residual flux levels of nearly-equal magnitude but opposite polarity in two of the transformer's core segments and a reduced flux in the remaining core segment of a three-phase transformer such that the transformer can be energized with reduced inrush current in the windings by energizing all phases of the transformer at the same instant as defined by a positively referenced voltage peak on the remaining winding.

BRIEF DESCRIPTION OF THE DRAWINGS

Although the characteristic features of this disclosure will be particularly pointed out in the claims, the disclosure itself, and the manner in which it may be made and used, may be better understood by referring to the following description taken in connection with the accompanying drawings forming a part hereof, wherein like reference numerals refer to like parts throughout the several views and in which:

FIG. 8c is a simplified depiction of a prefluxing circuit coupled to the magnetic core and windings of a single-core, five-leg power transformer.

DESCRIPTION OF THE PREFERRED EMBODIMENT

One method proposed by the present inventor for reducing inrush current in a single-phase transformer involves establishing a residual flux in the transformer core by means of a pre-fluxing circuit attached to one of the transformer's windings. The residual flux established in the transformer core approaches the prospective flux (the flux in the transformer core under steady state conditions) which will be produced when the winding is energized at a specific system voltage angle. As a consequence, inrush current to the pre-fluxed winding can be significantly reduced upon energization of the winding. The pre-fluxing device establishes the appropriate residual flux in the transformer core by supplying an appropriate amount of volt-seconds, also known as flux linkages, to the transformer core.

The system of the present disclosure reduces inrush current in a three-phase transformer by simultaneously establishing residual flux levels in each of the three core segments associated with the transformer primary windings which levels are near the prospective flux levels corresponding to the applied three voltage phases at the instant of energization of the transformer. More specifically, the present disclosure provides for pre-fluxing a three-phase transformer by applying volt-seconds of an appropriate amount serially to two of the primary windings to produce nearly equal but opposite magnetic residual flux levels near to the prospective flux levels of the core segments associated with the two windings at the time of energization, and a reduced flux level in the core segment associated with the third primary winding. Then, by causing all three phases of the transformer to be energized at the same instant by a three-phase voltage source of which this instant is defined when the third (non-prefluxed) primary winding is at a "positively-referenced" voltage peak (as explained further herein), referenced to the "positively" fluxed core, and by having established the residual flux levels in the two pre-fluxed core segments near the then existing prospective flux levels of the associated phases at the instant of energization, inrush current is effectively reduced.

Figure 1:
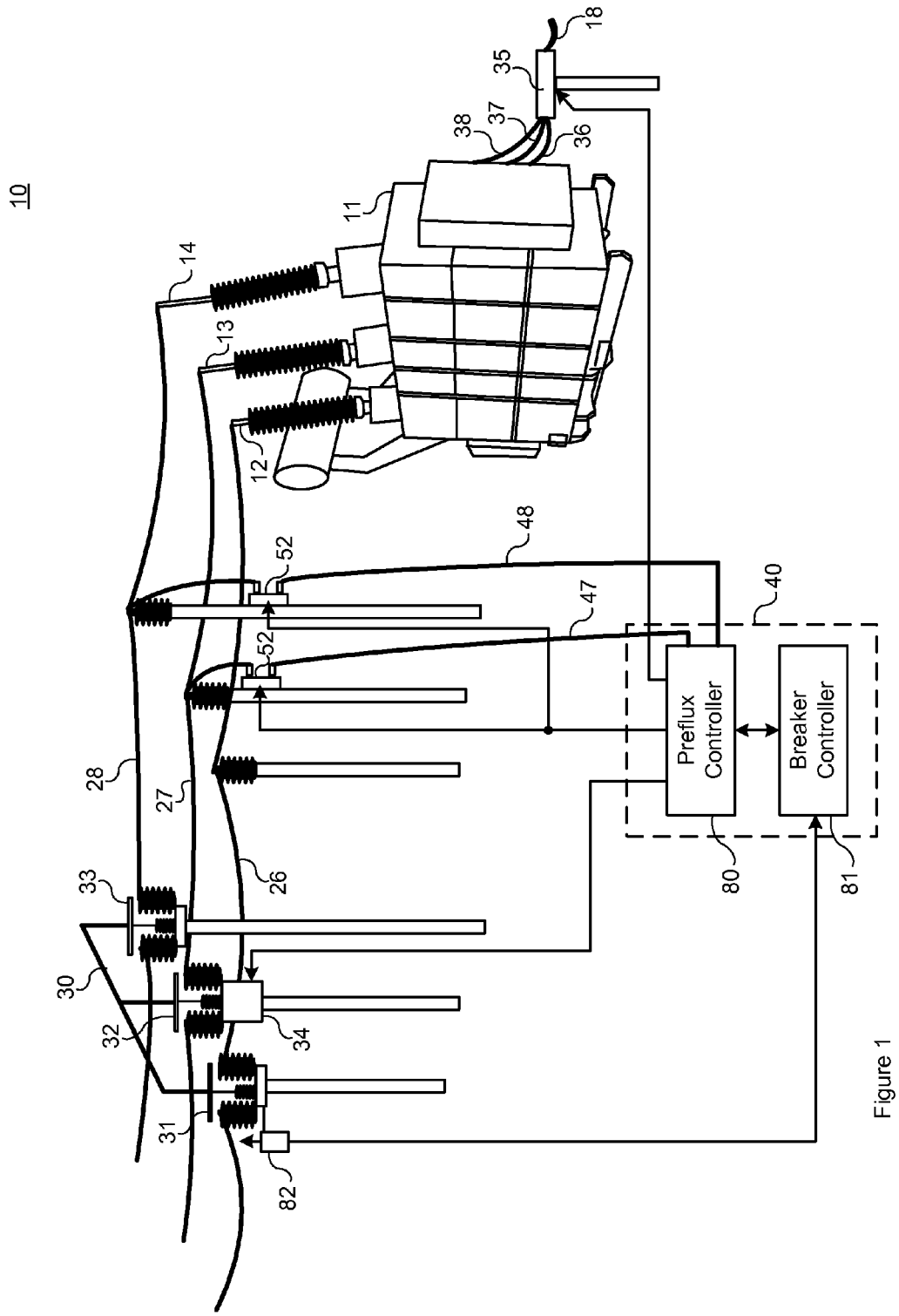
FIG. 1 is a simplified perspective view of a power delivery substation incorporating a pre-fluxing system constructed in accordance with the disclosure.
Figure 2:
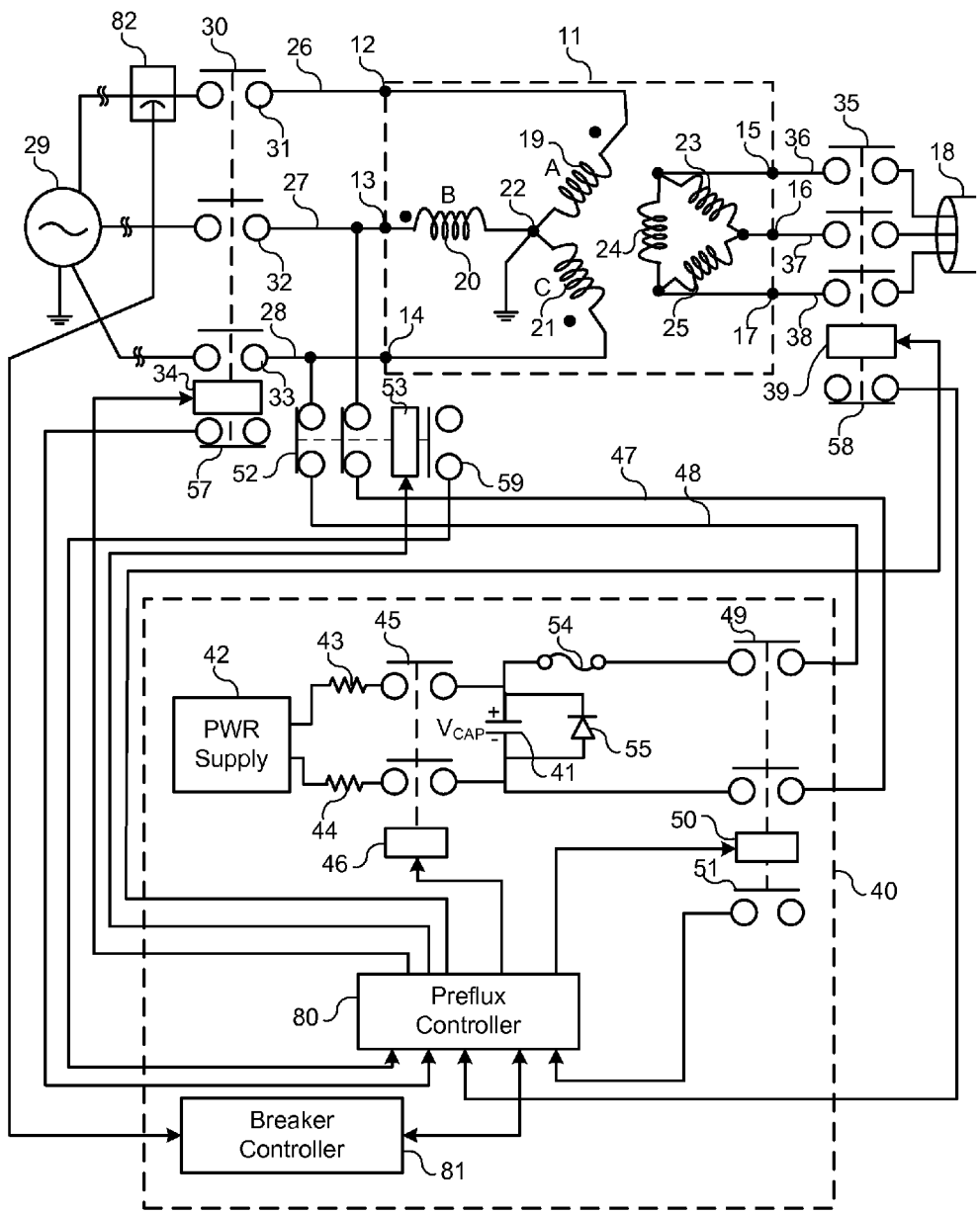
FIG. 2 is a simplified schematic diagram partially in functional block form showing a pre-fluxing system constructed in accordance with the disclosure.

Referring to the drawings, and particularly to FIGS. 1 and 2, a power utility substation 10 is seen to include a three-phase transformer 11 of conventional design having high voltage primary terminals 12, 13 and 14 corresponding to the A, B and C phases of the transformer, respectively, and low voltage secondary output terminals 15, 16 and 17 (FIG. 2) connected to a load (not shown) by a conductor 18. Within transformer 11 three Y-connected primary windings 19, 20, and 21 (FIG. 2) are each connected at one end to the transformer input terminals 12, 13 and 14, respectively, and at their other end to a common ground 22. Three delta-connected secondary or tertiary windings 23, 24 and 25 are connected to output terminals 15, 16 and 17 of the transformer.

Power is supplied to primary windings 19, 20 and 21 by a three-phase supply line consisting of conductors 26, 27 and 28 connected off-site to a conventional three-phase generator 29 (FIG. 2). A three-gang breaker 30 having contacts 31, 32 and 33 serially connected in conductors 26, 27 and 28 between generator 29 and the primary terminals 12, 13 and 14 of transformer 11 enables the three-phase connection to transformer 11 to be selectively interrupted or established in response to a control signal applied to an actuator solenoid 34 associated with the breaker. Another three-gang breaker 35 having respective contacts in conductors 36, 37 and 38, and having an actuator solenoid 39 (FIG. 2) enables the transformer secondary windings 23, 24 and 25 to be disconnected from the low-voltage transformer load circuit 18.

Figure 3:
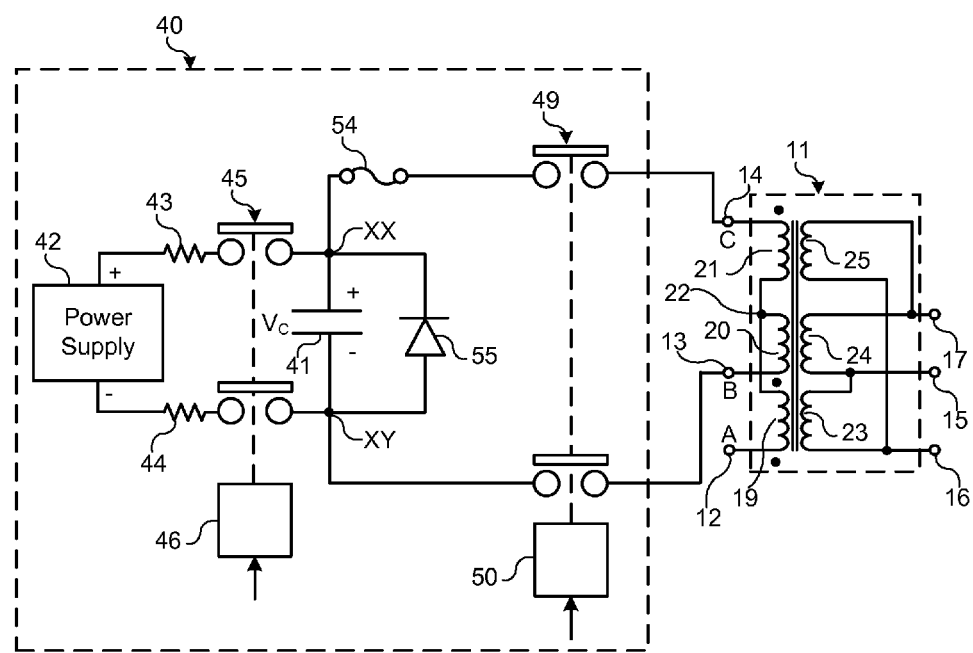
FIG. 3 is a simplified schematic diagram of a portion of the pre-fluxing system of FIG. 2.

To reduce inrush current to transformer 11 upon closure of breaker 30, substation 10 includes, in accordance with the disclosure, a pre-flux system 40. As shown in FIGS. 2 and 3, this system includes a dielectric pre-fluxing capacitor 41 which is charged to a pre-determined voltage level by a direct current power supply 42 through a pair of charge-current limiting resistors 43 and 44 and the normally open contacts of a pre-charging control breaker 45. Breaker 45, which may be conventional in design and operation, is actuated by a solenoid 46. To establish a pre-determined residual flux in the core segments associated with the three primary windings 19, 20 and 21, capacitor 41 is serially discharged through the B and C phase primary windings 20 and 21 through a circuit which includes conductors 47 and 48 and the normally open contacts of a pre-flux breaker 49. Breaker 49, which may be conventional in design and operation, is actuated by a solenoid 50. A set of contacts 51 mechanically connected to the breaker provides an indication of breaker status. An isolation breaker 52, having normally-open contacts serially connected in conductors 47 and 48, is provided to isolate preflux circuit 40 from high voltage lines 27 and 28 when the preflux circuit is not in use. Breaker 52, which may be conventional in design and operation, is actuated by a solenoid 53. A series-connected fuse 54 opens in the event of excessive current in the charging circuit. A diode 55 connected across capacitor 41 together with the capacitance of capacitor 41 and the inductance series connected primary windings 20 and 21, establish a ¼ cycle resonant discharge circuit between the capacitor and the windings, such that upon closure of the contacts of breaker 49 (isolation breaker 52 having been previously closed) the capacitor is rapidly discharged through the two serially connected primary windings 20 and 21 to establish a residual flux in the transformer magnetic core material of a magnitude dependent on the magnetic characteristics of the transformer core material.

In operation, transformer 11 is first isolated from its supply (generator 29) by activation of solenoid 34 to open contacts 31, 32 and 33 of line disconnect breaker 30. The transformer is also isolated from its load by activation of solenoid 39 to open the contacts of load-disconnect breaker 35. Breaker 30 preferably includes a set of mechanically-linked contacts 57 which confirm that the breaker has opened, and load disconnect breaker 35 preferably includes similar mechanically-linked contacts 58 which confirm that the load disconnect breaker has operated. Next, pre-flux circuit 40 is connected to primary windings 20 and 21 by activation of solenoid 53, which closes the contacts of isolation breaker 52. A set of mechanically-coupled contacts 59 mechanically coupled to the breaker provide confirmation that the breaker contacts have closed.

In preparation for the pre-fluxing operation, capacitor 41 is charged to a predetermined voltage by application of a control signal to solenoid 46, which causes closure of capacitor pre-charge breaker 45 to connect the capacitor to DC supply 42 through charge rate limiting resistors 43 and 44. After capacitor 41 has fully charged, breaker 45 is opened and capacitor 41 remains in its predetermined voltage level. Next, provided line breaker 30 and load disconnect breaker 35 are open, and pre-flux isolation breaker 52 is closed, pre-flux capacitor 41 is discharged through the serially connected transformer primary windings 21 and 22 by momentary activation of solenoid 50 to close pre-flux breaker 49. After capacitor 41 has fully discharged through windings 21 and 22, breaker 49 is opened.

Since the predetermined desired pre-flux state has at this time been established in the two primary windings, isolation breaker 52 is opened to disconnect pre-flux circuit 40 from supply lines 27 and 28 and the primary windings of transformer 11. As shown in FIG. 1, the function of isolation breaker 52 may in practice be advantageously accomplished by two separate identical breakers having their actuation solenoids connected in parallel and contacts serially connected in respective ones of prefluxing conductors 47 and 48.

Figure 4:
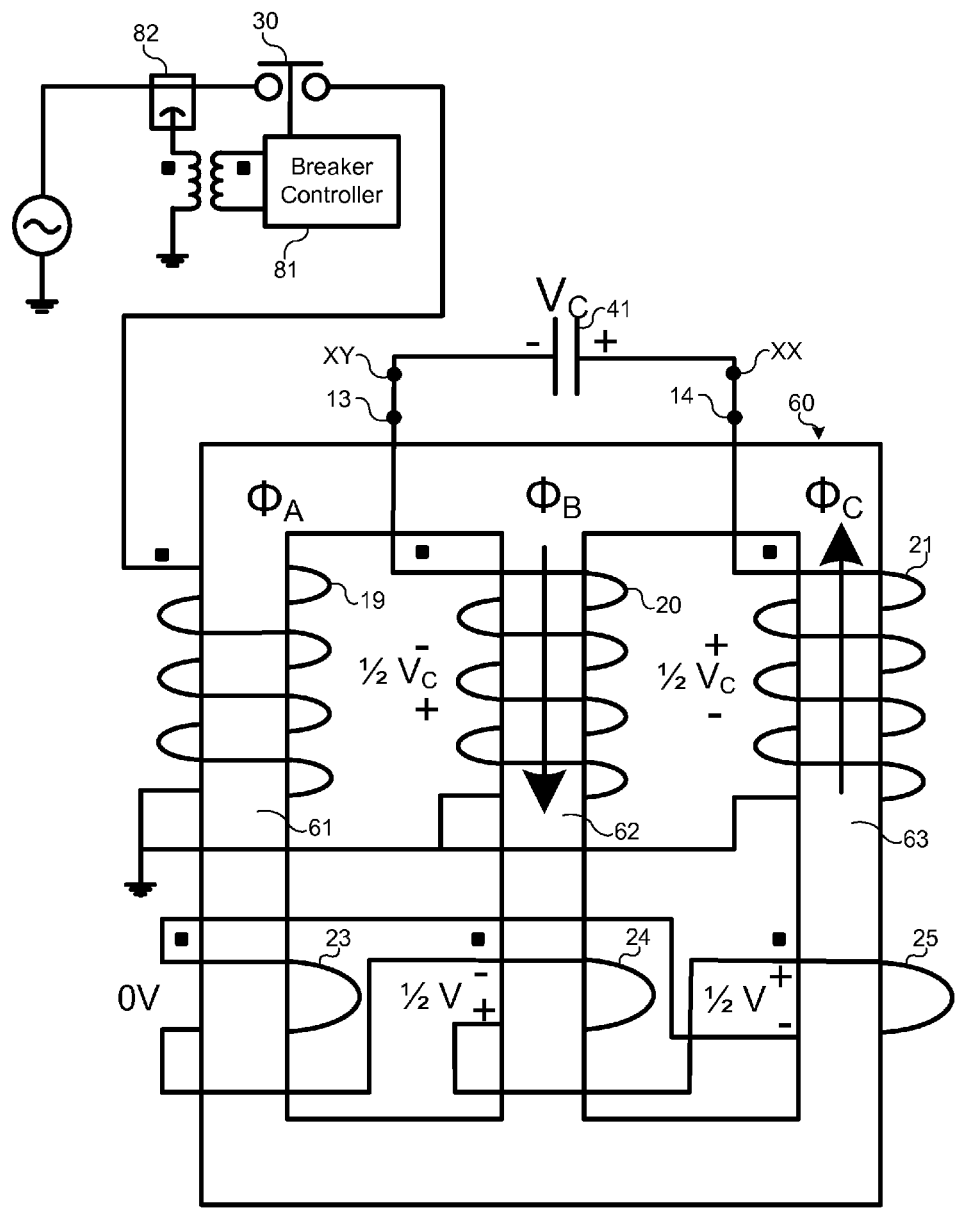
FIG. 4 is a simplified depiction of a prefluxing circuit coupled to the magnetic core and windings of a conventional three-phase power transformer.

As generally shown in FIG. 4, a generator 29 (see FIG. 2) is coupled to transformer 11 (see FIG. 2) through contact 30, which is controlled by breaker controller 81 as described herein. Transformer 11, in accordance with conventional practice, includes a magnetic core 60 having core segments 61, 62 and 63 associated with primary windings 19, 20 and 21, and secondary windings 23, 24 and 25, respectively. The discharge of capacitor 41 through windings 20 and 21 causes approximately ½ of the capacitor 41 voltage to appear across each of windings 20 and 21, which establishes a residual flux in the associated core segments 62 and 63. Moreover, by reason of the purposeful connection of the capacitor 41 to the transformer windings 20 and 21 in such a manner that the direction of the flux developed is considered "positive" in core segment 63, and "negative" in core segment 62. In the case of an ABC phase rotation and using B & C phase windings 20 & 21, capacitor's 41 positive voltage terminal XX is connected to the polar (dotted) terminal 14 of the C phase winding 21 and the capacitor's 41 negative terminal XY is connected to the polar (dotted) terminal 13 of the B phase winding 20. The flux in core segments 62 & 63 generates a voltage in the delta-windings of nearly equal magnitude but opposite polarity. Because of the delta winding and Kirchhoff's Voltage Law, the voltage in the delta winding of the uninvolved core segment 61 has a voltage which tends towards zero developed across it which encourages a reduced residual flux (which may be a near-zero flux) in core segment 61.

Figure 5:
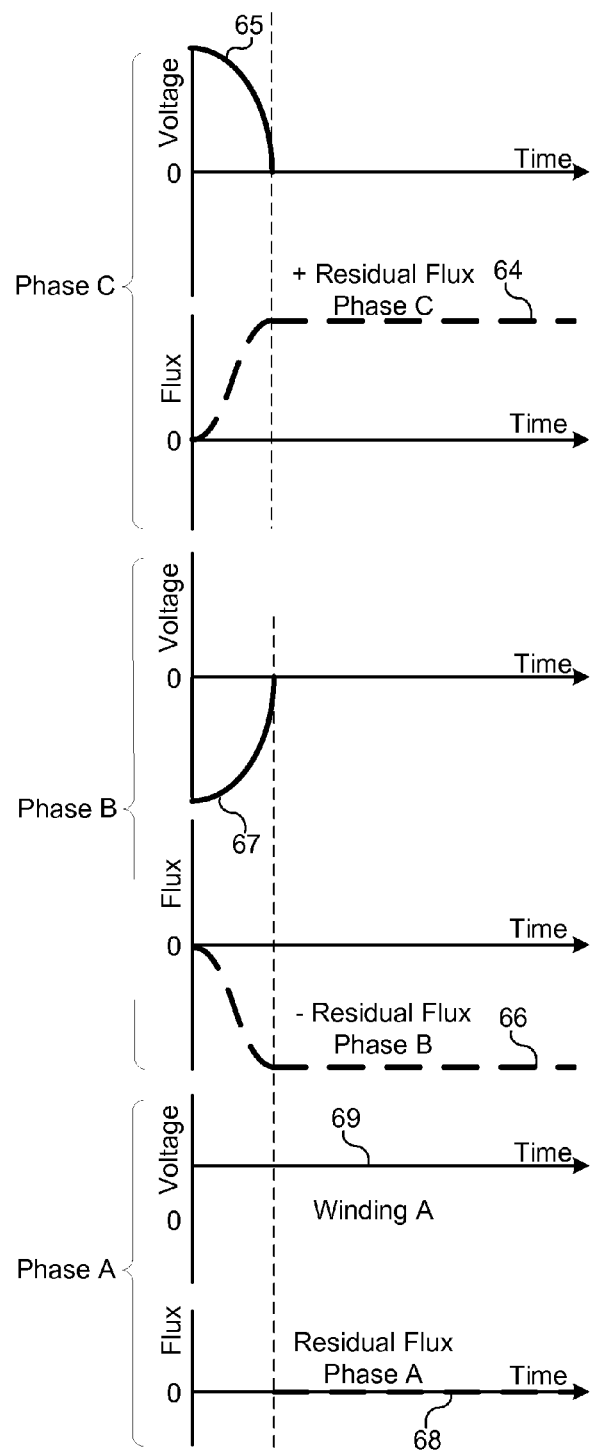
FIG. 5 is a simplified graphical depiction of the operation of the pre-fluxing system relative to the three primary windings of the transformer of FIG. 4.

The status of the residual flux in the three windings following discharge of capacitor 41 is illustrated in FIG. 5. There it is seen that a residual flux 64 in the core segment 63 of the phase C primary winding 21 exists in a relatively positive direction as a consequence of the voltage 65 supplied from capacitor 41 being in a relatively positive direction, and that a residual flux 66 in the core segment 62 of the phase B primary winding 20 exists of nearly the same magnitude as residual flux 64 but in a relatively negative direction as a consequence of the voltage 67 supplied from capacitor 41 being in a relatively negative direction. Moreover, it is seen that the opposite direction fluxes in core segments 62 and 63, through the use of the delta-connected winding, encourage a near-zero residual flux 68 in the core segment 61 of the A phase primary winding 19 (See FIG. 4).

Figure 6:
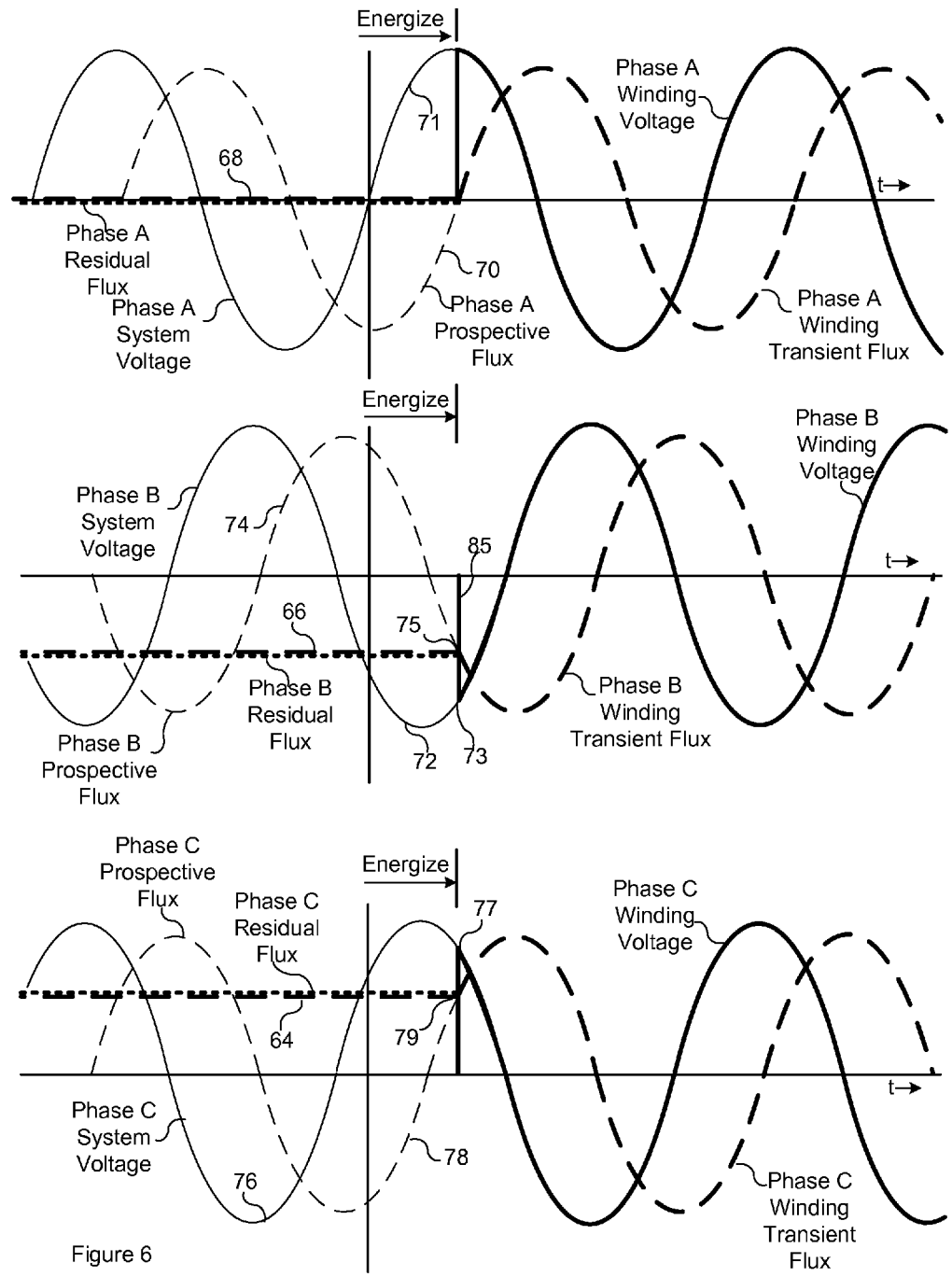
FIG. 6 is a simplified graphical depiction of the application of voltage to the transformer of FIG. 4 after it has been pre-fluxed.

In accordance with the disclosure, and as illustrated in FIG. 6, the above-described prefluxing of primary windings 20 and 21 enables the inrush current to transformer 11 to be reduced by controlling the closure of line breaker 30 such that the voltage applied to the A phase primary winding 19 is at its positively-referenced peak at the instant of energization (i.e. at the closing of breaker 30). Since the A phase prospective flux, which lags the A phase voltage 71 by 90°, is at this instant zero, the prospective flux is near the residual flux, and inrush current is reduced.

At the same instant of energization, the B phase system voltage 72, which in a three-phase system lags the A phase system voltage by 120°, is at a predetermined relatively negative level 73 and the corresponding B phase prospective flux 74 is at a predetermined relatively negative level 75, which, approaches the pre-established phase B residual flux 66 (FIG. 5). Similarly, at the same instant of energization, the C phase system voltage 76, which lags the B phase system voltage by 120°, is at a predetermined relatively positive level 77 and the corresponding C phase prospective flux 78 is at a relatively positive level 79, which approaches the previously established C phase residual flux 64 (FIG. 5).

Figure 7:
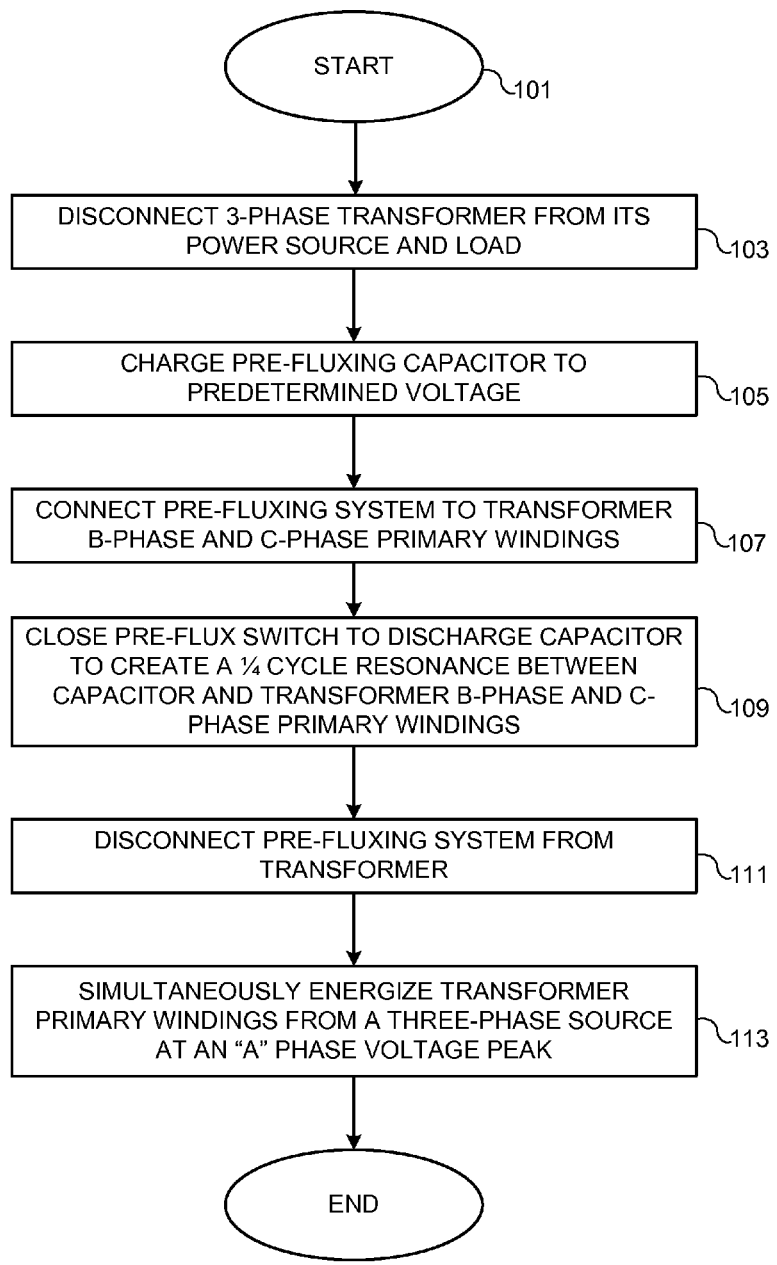
FIG. 7 is a simplified flow diagram illustrating the sequence of the principal operations performed by the pre-fluxing system of FIGS. 1-3.

The operation of line breaker 30, load breaker 35, isolation breaker 52, pre-flux breaker 49 and capacitor pre-charge breaker 45 are controlled by a pre-flux system 40. In one embodiment, such operation may be controlled by the breaker controller 81, and in one embodiment, such operation may be controlled by the pre-flux system controller 80, and in one embodiment, such operation may be controlled by a combination of the breaker controller 81 and the pre-flux system controller 80. As illustrated by the simplified flow chart of FIG. 7, this controller, upon receiving a user-initiated start command at 101, functions at 103 to disconnect the three-phase transformer 11 from its power source and load by actuating solenoids 34 and 39 to open breakers 30 and 35, respectively. Next, after the opening of these breakers has been confirmed by respective mechanically coupled contacts 57 and 58, the controller charges the pre-fluxing capacitor 41 to a predetermined voltage 105 level by actuating solenoid 46 to close breaker 45. After the capacitor has been fully charged, breaker 45 is opened and in 107 the controller connects the pre-fluxing system 40 to transformer B-phase and C-phase primary windings 20 and 21 by actuating solenoid 53 to close isolation breaker 52. After the closure of breaker 52 has been confirmed by contacts 59, solenoid 50 is actuated at 109 to close pre-flux switch (breaker 49) to discharge capacitor 41 to create a ¼-cycle resonance between capacitor and transformer B-phase and C-phase primary windings. Then, after the capacitor has discharged, and breaker 49 has opened, as confirmed by contacts 51, the controller disconnects the pre-fluxing system 40 from the transformer 111 and the high voltage supply conductors 27 and 28 by opening isolation contactor 52. It remains for controller 80 to now at 113 simultaneously energize transformer windings from a three-phase source at an "A"-phase positive voltage peak. The controller accordingly closes breaker 30 at the positively-referenced voltage peak of the A phase conductor 26. By reason of the residual flux levels of the core segments 61, 62 and 63 of windings 19, 20, and 21 closely matching the A, B and C phase prospective flux levels at the instant of closure, respectively, inrush current to transformer 11 is reduced.

For the system to be effective it is necessary that breaker 30 connect all three phases of the high voltage supply line to the primary windings of transformer 11 simultaneously upon occurrence of a positively-referenced voltage peak on the zero residual flux phase. This positively referenced voltage peak is the voltage peak causing the polar (dotted) terminal of the zero residual flux phase to be at a positive potential with respect to the ground reference (shown in FIG. 6). To this end, a three phase quick-connect breaker having a high degree of repeatability is utilized in combination with a breaker controller 81. Voltage on the zero residual flux phase is sensed by a conventional sensor 82 to develop a voltage phase sense signal which is supplied to the breaker controller 81. Sensor 82 needs to be wired to controller 81 such that it has the same positive reference as the transformer winding (see FIG. 4). Breaker controller 81, upon receipt of a command signal from system controller 80, senses the timing of a voltage minimum on conductor 26 and, taking into account the characteristics of the breaker, sends a command signal to controller 80 to cause the actuator solenoid 34 of breaker 30 to be timely actuated to close the breaker at the desired instant, in this case the positive voltage peak. Breaker controller 81 may for example, be an appropriately programmed model SEL 352 Relay manufactured by Schweitzer Engineering Laboratories, Inc., of Pullman, Wash.

In operation, when a three-phase sinusoidal voltage is applied to the primary windings of the transformer an accompanying prospective flux is generated in the magnetic core segments associated with the windings which lags the applied voltage by 90°. The magnitude of the inrush current in each winding diminishes as the magnitude of the prospective flux approaches the magnitude of the residual flux in the winding, and approaches zero when the fluxes are equal. To this end, the present disclosure establishes a residual flux level in each core segment which approaches the prospective flux level that is generated in each core segment by the applied three-phase voltage.

By establishing a near-zero flux level in the core segment associated with one of the three primary windings, and equal but opposite magnetic polarity flux levels in the two remaining core segments associated with the remaining two primary windings, it is only necessary that the transformer primary windings be energized at the same instant that the phase voltage applied to the winding associated with the near-zero flux core segment is at a positively-referenced voltage peak. The induced voltages occurring in the delta-connected secondary windings of the transformer assisted in establishing the near-zero residual flux in the core segment during the pre-fluxing operation.

The desired residual flux levels in the three core segments are achieved by discharging capacitor 41, which has been pre-charged to a predetermined voltage (i.e. charge level), serially through the two primary windings to establish the necessary residual flux levels in the core segments associated with the two windings.

The capacitance of the pre-fluxing capacitor is selected to resonate with the magnetizing inductance presented by the two series-connected primary windings, which causes the capacitor to be fully discharged within one-quarter cycle of the resulting resonate frequency. After the capacitor discharges its energy into the transformer, the diode placed across the capacitors terminals begins conducting to prevent reverse charging of the capacitor. The capacitor is essentially shorted at this point and the current decays to zero according to the L/R time constant at which point the transformer residual flux is established.

While pre-fluxing of the B and C phase windings with ABC phase rotation has been shown in the embodiment of FIGS. 1-6, it will be appreciated that any two primary windings can be prefluxed for either ABC or ACB phase rotation, provided that the transformer is energized at the positively-referenced voltage peak of the phase of the remaining near-zero flux winding, and that the polarity of the voltage supplied by the pre-fluxing capacitor will be in accordance with the direction of phase rotation of the applied three phase voltage and the selected positively-referenced voltage peak. The following rule holds for any phase rotation and winding selection: Whichever phase (A, B, or C) positive voltage peak is selected for transformer energization, the phase which precedes it in the phase sequence is the phase that must be positively fluxed. In the case of energizing at an A phase positive voltage peak for ABC phase rotation, the C phase must be fluxed with a positive polarity and B phase results with a negative polarity flux. In the case of energizing at a C phase positive voltage peak for ACB phase rotation, the A phase must be fluxed with a positive polarity and B phase results with a negative polarity flux.

The capacitance and initial voltage level of the pre-fluxing capacitor is selected in such a way that during the one-quarter resonance cycle created between the pre-fluxing capacitor and the two series-connected primary windings a sufficient number of volt-seconds are supplied to the transformer iron to achieve maximal residual flux in each of the two core segments of the transformer associated with the pre-fluxed primary windings.

The following illustrates the calculation of capacitor size for a typical 60 hertz 200 MVA 230 kV three phase utility transformer installed in a substation having a 230 volt DC source for charging the capacitor of the pre-fluxing device:

$$S_{3\phi} = 200 \text{ MVA} \quad V_{LL_P} = 230 \text{ kV} \quad f = 60 \text{ Hz}$$

$$S_{1\phi} = \frac{S_{3\phi}}{3} = 66.67 \text{ MVA}$$

$$V_{LN_P} = \frac{V_{LL_P}}{\sqrt{3}} = 132.791 \text{ kV}$$

$$V_{cap} = 230 \text{ V}$$

Where $S_{3\phi}$ is three-phase apparent power; $S_{1\phi}$ single-phase apparent power, f is the line frequency; $V_{LL\_P}$ is the primary line to line voltage; $V_{LN\_P}$ is the primary line to neutral voltage, and $V_{cap}$ is the voltage of the pre-flux capacitor.

Given this development, the capacitance of the pre-flux capacitor can be expressed as follows:

$$C_{pf} = \left(\frac{1}{L_{m_{approxP}}}\right)\left(\frac{\sqrt{2}}{2\cdot\pi}\cdot\frac{V_{LN_P}}{f\cdot V_{cap}}\right)^2 = 334.289 \text{ mF}$$

Where $C_{pf}$ is the capacitance of the pre-fluxing capacitor, $L_{m_{approxP}}$ is the approximate magnetizing inductance of the transformer to be prefluxed referred to the transformer's primary side.

And the energy stored in the pre-flux capacitor can be expressed as follows:

$$E_{pf} = \frac{1}{2} C_{pf} V_{cap}^2 = 8.842 \text{ kJ}$$

Allowing for losses, $E_{pf}$ can be set equal to 10 kJ. Accordingly, given a typical 100 watt 230 volt DC power supply, the pre-fluxing system will require the following charging time for each application:

$$P_{supply} = 100 \text{ W}$$

$$t_{charge} = \frac{E_{pf}}{P_{supply}} = 100 \text{ s}$$

Figure 8A:
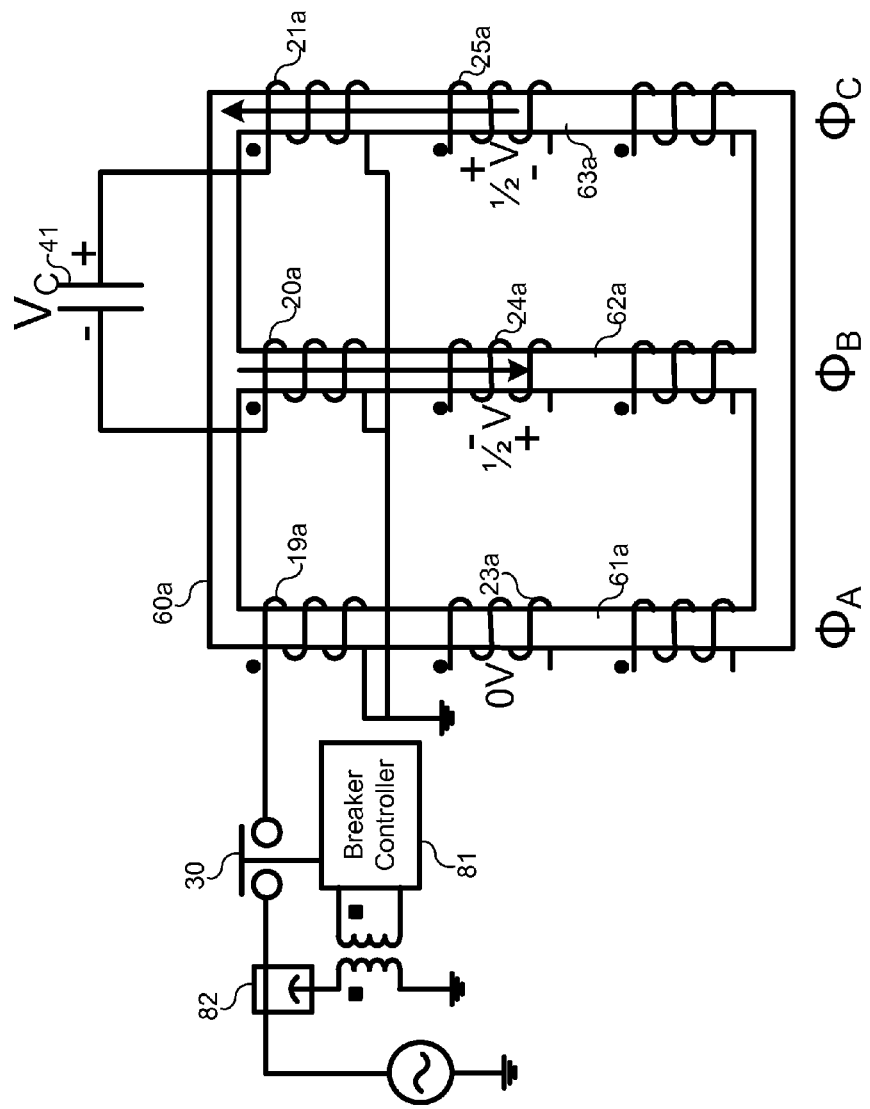
FIG. 8a is a simplified depiction of a prefluxing circuit coupled to the magnetic core and windings of a single-core, three-leg power transformer.
Figure 8B:
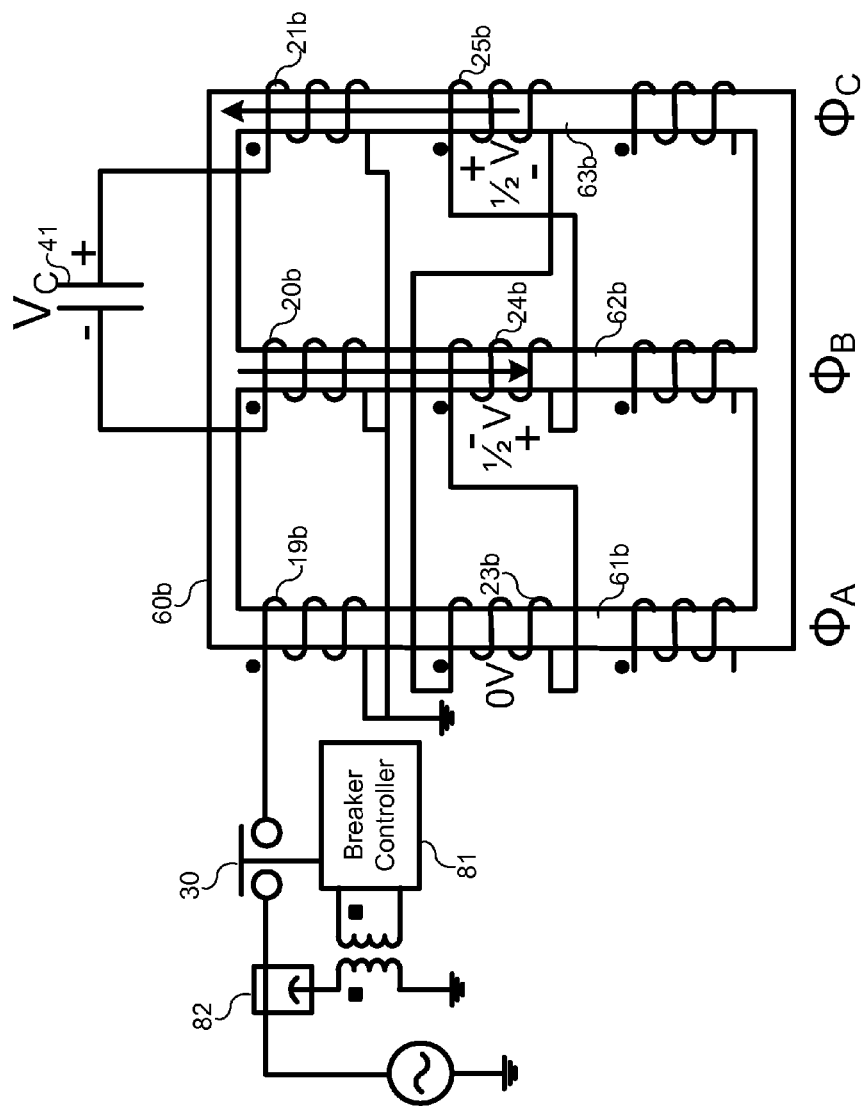
FIG. 8b is a simplified depiction of a prefluxing circuit coupled to the magnetic core and windings of a single-core, three-leg power transformer.
Figure 8D:
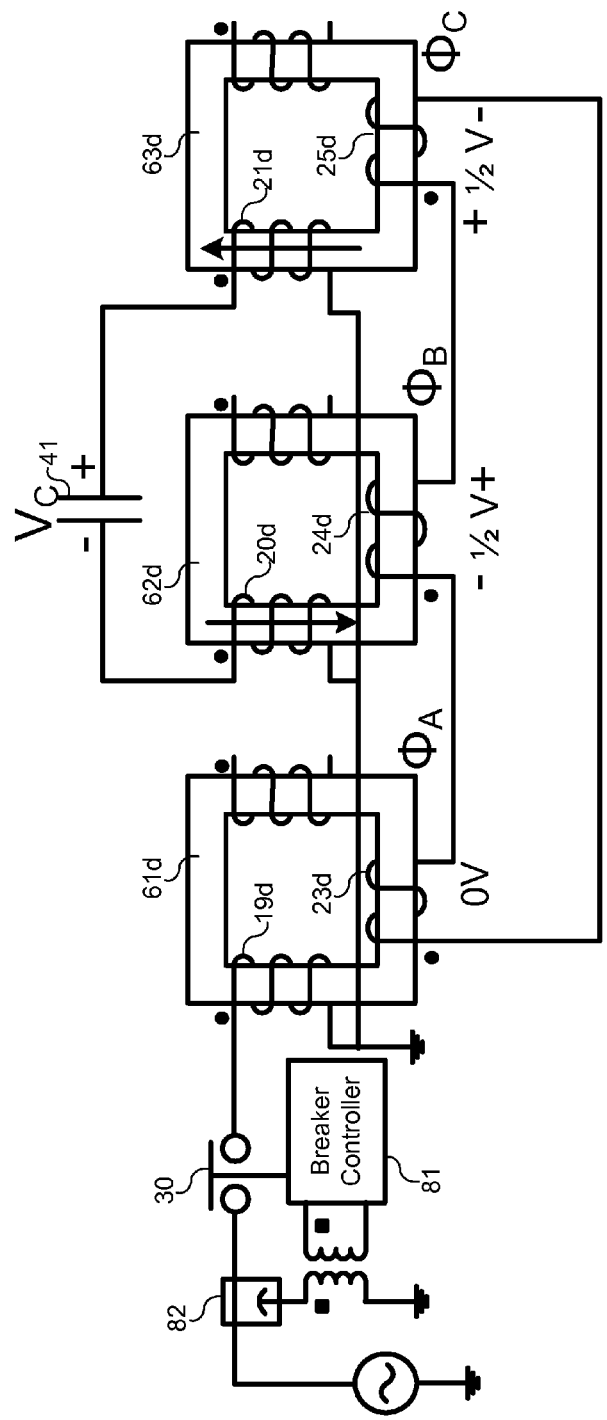
FIG. 8d is a simplified depiction of a prefluxing circuit coupled to the magnetic core and windings of a three-core power transformer.

The foregoing description has explained the operation of the disclosed transformer pre-fluxing system with respect to one type of transformer. However, the disclosed system will work with many different types of transformer configurations. For example, FIG. 8a depicts a transformer having a single core 60a with three legs 61a, 62a, and 63a, and three separate sets of windings. The first set of windings 19a, 20a, and 21a are wye configured, with a generator coupled to winding 19a through a circuit breaker 30 that is controlled by breaker-controller 81, which receives line data through sensor 82; and a pre-flux capacitor disposed across windings 20a and 21a. The remaining windings could be configured in delta or wye configurations. Note that transformer of FIG. 8a is depicted without a delta winding, which is acceptable because in a single-core, three-leg configuration, the sum of the flux on the legs approaches zero, and, because the pre-fluxing device forced the flux in two of the three legs to substantially equal and opposite values, the flux on the remaining of the three legs should approach zero. In a single-core, three-leg design (such as the transformer illustrated in FIG. 4), a delta winding may help further force the flux in the remaining of the three legs to approach zero. However, the delta winding is needed for certain other transformer configurations due to the transformer including more than three legs. FIG. 8b depicts a transformer having a single core 60b with three legs 61b, 62b, and 63b, and three sets of windings. The first set of windings 19b, 20b, and 21b are wye configured, with a generator coupled to winding 19b through a circuit breaker 30 that is controlled by breaker-controller 81, which receives line data through sensor 82; and a pre-fluxing capacitor 41 disposed across windings 20b and 21b. The secondary windings 23b, 24b, and 25b are delta configured, and the tertiary windings may be either wye or delta configured. FIG. 8c depicts a transformer having a single core 60c and five legs, although only legs 61c, 62c, and 63c are depicted as having windings. The primary windings 19c, 20c, and 21c are wye configured, with a generator coupled to winding 19c through a circuit breaker 30 that is controlled by breaker-controller 81, which receives line data through sensor 82; and a pre-fluxing capacitor 41 disposed across windings 20c and 21c. The secondary windings 23c, 24c, and 25c are delta configured, and the tertiary windings may be either wye or delta configured. In addition, while all embodiments of the disclosed pre-fluxing system disclosed thus far have been discussed in conjunction with a single core transformer, there is no such limitation in the use of the disclosed system. By way of example, FIG. 8d depicts a transformer having three separate cores 61d, 62d, and 63d. The primary windings 19d, 20d, and 21d of the three cores 61d, 62d, and 63d are wye configured, with a generator coupled to winding 19d through a circuit breaker 30 that is controlled by breaker-controller 81, which receives line data through sensor 82; and a pre-fluxing capacitor 41 disposed across windings 20d and 21d. Secondary windings 23d, 24d, and 25d are delta configured.

While an embodiment of the disclosure is shown permanently installed in a utility substation, it will be appreciated that the disclosure can be practiced as a temporarily installed system. In this case the pre-fluxing system 40 would be temporarily connected to the transformer and actuated only after the transformer primary and secondary circuits had been separately disconnected, as the "load" side of the transformer can, in some cases, energize the transformer. The pre-flux system 40 would then be disconnected and the line circuit would then be subsequently connected to the transformer primary winding at a positively-referenced voltage peak to the zero flux primary winding core segment as previously described to reduce inrush current.

Furthermore, while an embodiment of the disclosure is shown as applying a pre-flux to the transformer core from the primary windings of the transformer, it will be appreciated that the disclosure can be practiced as applying the pre-flux to the secondary windings of the transformer using the principles discussed herein. Indeed, the disclosure can be practiced using any of the various standard transformer windings useful for introducing a pre-flux to the core or cores of the transformer. Some of the various transformer windings useful for introducing a pre-flux to the core or cores may include the primary windings, secondary windings, or tertiary windings.

Furthermore, while an embodiment of the disclosure is shown as applying a pre-flux to the transformer core, it will be appreciated that the disclosure can be practiced on a transformer of the type shown in FIG. 8c or 8d but that doesn't have a delta-connected secondary or delta-connected tertiary winding. In this case, the same procedure for pre-fluxing is followed depending on the phase that is selected to be energized at its positive voltage peak and the phase rotation of the system, as was described previously.

Furthermore, while an embodiment of the disclosure is shown as applying a pre-flux to the transformer core from a set of transformer windings connected in a wye configuration, it will be appreciated that the disclosure can be practiced on a set of transformer windings that are connected in delta. In this case, the same procedure for pre-fluxing is followed depending on the phase that is selected to be energized at its positive voltage peak and the phase rotation of the system, as was described previously. That is, the pre-fluxing circuit is used to connect the pre-fluxing capacitor to the delta windings to discharge the pre-fluxing capacitor through the parallel combination of the first winding in one branch and the series combination of the remaining two windings in the second branch, thus establishing residual fluxes in the core segment associated with the first winding at a first polarity and magnitude, and in the remaining two core segments associated with the remaining two windings in an opposite polarity and around half of the magnitude of the residual flux in the one core segment. In applying the pre-fluxing capacitor in this configuration, it is important to note the specific type of delta connection used by the transformer.

Figure 9:
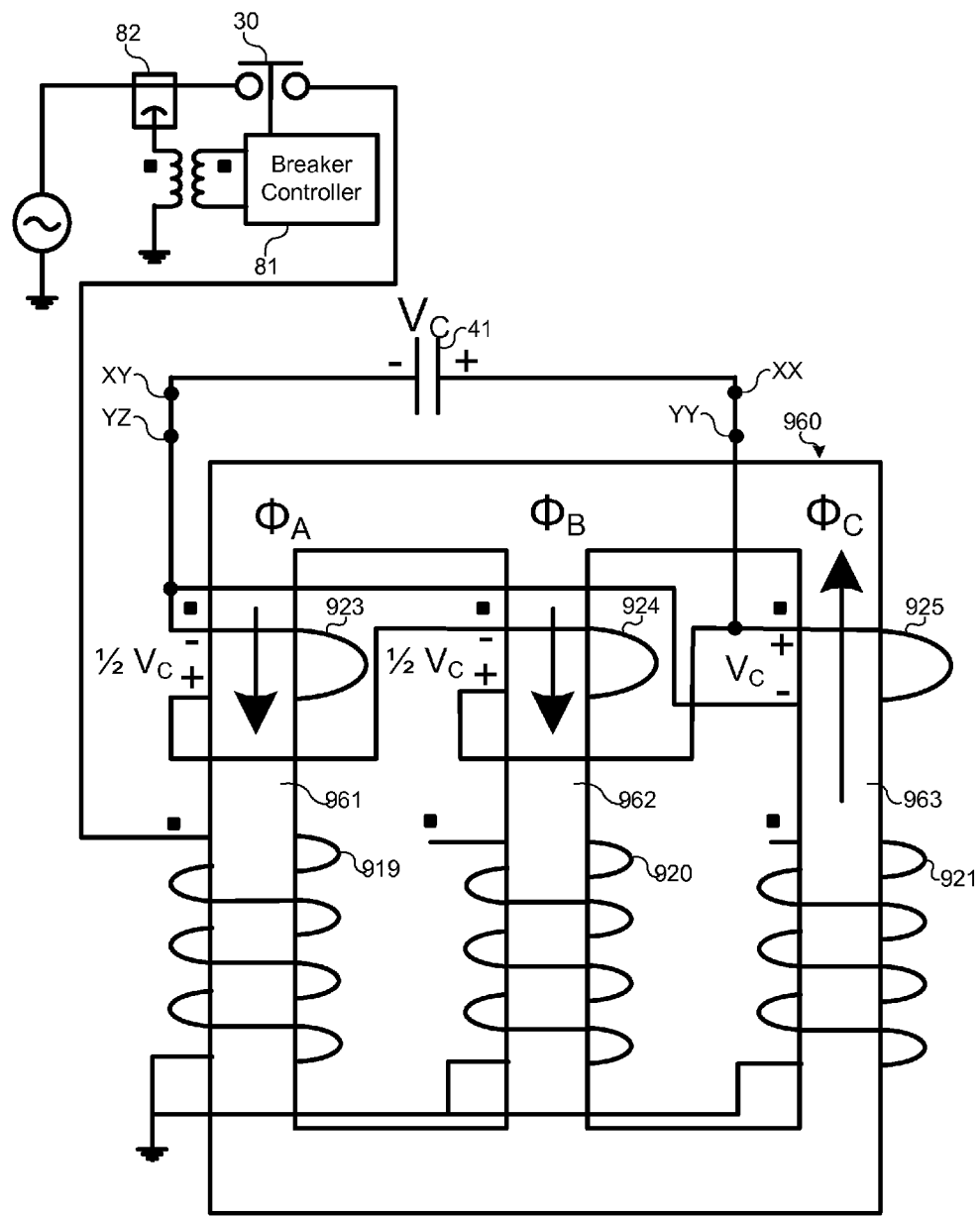

FIG. 9 illustrates a transformer with "DAC" connections that has ABC phase rotation. In this example, the pre-fluxing algorithm may be suited for closing on the A phase voltage peak. The example illustrated in FIG. 9 includes a transformer core 960 having three cores segments 961, 962, 963 each associated with an electrical phase (A, B, C). The transformer includes a delta winding that includes windings 923, 924, 925 each associated with an electrical phase and core segment 961, 962, 963. The transformer further includes a second set of windings (which may be the primary windings to be connected to a generator via breaker 30) in Wye configuration 919, 920, 921 each associated with a core segment 961, 962, 963 corresponding to a specific phase. In this example, the transformer is wound in "DAC" configuration. In this example, following the discussion previously about the phase selected to close in on the voltage peak and the given phase rotation, C phase is the phase requiring the positive flux. When a delta winding set is connected in a "DAC" configuration, it specifies that the polar (dotted) winding end of A phase 923 is connected to the non-polar winding end of C phase 925. Thus for C phase core segment 963 to achieve the maximum possible positive flux, the pre-fluxing capacitor 41 positive polarity terminal, XX, is connected to the C phase polar (dotted) terminal, YY, and the pre-fluxing capacitor 41 negative polarity terminal, XY, is connected to the A phase polar (dotted) terminal, YZ, which establishes a positive polarity flux of a certain magnitude in C phase core segment 963 and a negative polarity flux with around half the magnitude in A and B phase core segments 961, 962.

Another possible delta winding configuration is a "DAB" which specifies the polar (dotted) winding end of A phase windings 923 may be connected to the non-polar winding end of B phase windings 924 (not as illustrated in FIG. 9). In this example, the polar (dotted) winding end of B phase windings 924 may be connected to the non-polar winding end of C phase windings 925 and the polar (dotted) winding end of C phase windings 925 may be connected to the non-polar winding end of A phase windings 923. Thus, in the case of a system with ACB phase rotation, and if C phase were the phase selected to close at the voltage peak, the A phase core segment 961 would be fluxed with the positive flux. In the case of a "DAB" connected delta winding, the pre-fluxing capacitor 41 positive polarity terminal, XX, may be connected to the polar (dotted) winding end of A phase windings 923 and the prefluxing capacitor 41 negative polarity terminal, XY, may be connected to the polar (dotted) winding end of C phase windings 925.

The foregoing description of the disclosure has been presented for purposes of illustration and description, and is not intended to be exhaustive or to limit the disclosure to the precise form disclosed. The description was selected to best explain the principles of the disclosure and practical application of these principles to enable others skilled in the art to best utilize the disclosure in various embodiments and various modifications as are suited to the particular use contemplated. It is intended that the scope of the invention not be limited by the specification, but be defined by the claims set forth below.

What is claimed is:

1. A pre-fluxing system for a three-phase transformer to reduce inrush current in the three-phase transformer having first A, B and C phase windings, second A, B and C phase windings, and a magnetic core having A, B and C segments associated with the first and second A, B and C phase windings, respectively, comprising:
   a three-phase line circuit including a three-phase line breaker for applying line voltage to the three-phase transformer;
   a pre-fluxing capacitor;
   a direct current source for charging the pre-fluxing capacitor;
   a charging circuit for connecting the direct current source to the pre-fluxing capacitor and charging the pre-fluxing capacitor to a predetermined voltage level;
   a pre-fluxing circuit for connecting the pre-fluxing capacitor to two first windings of the first A, B, and C phase windings; and
   a control circuit for controlling a closing of the three-phase line circuit to apply line voltage to the three-phase transformer coincident with a positively-referenced voltage peak of a phase associated with a pre-determined winding.

2. The pre-fluxing system as defined in claim 1, wherein the first A, B, and C phase windings are in wye configuration, and the pre-fluxing circuit is configured to discharge the pre-fluxing capacitor through the two first windings in series to establish residual fluxes of nearly equal magnitude but opposite polarity in two of the magnetic core A, B, and C segments associated with the two first windings.

3. The pre-fluxing system as defined in claim 1, wherein the magnetic core comprises three magnetic cores and wherein at least one of the first and second A, B, and C phase windings are in delta configuration.

4. The pre-fluxing system as defined in claim 1, wherein:
   the first A, B, and C phase windings are in delta configuration; and,
   the pre-fluxing circuit is configured to discharge the pre-fluxing capacitor through the first A, B, and C phase windings to establish a first residual flux comprising a magnitude and a polarity in the one of the first A, B, and C segments and second residual fluxes in two of the first A, B, and C segments, where the second residual fluxes comprise magnitudes less than that of the first residual flux and polarities opposite that of the first residual flux.

5. The pre-fluxing system as defined in claim 1, wherein the three-phase line circuit comprises a primary line circuit, the first A, B, and C phase windings comprise primary windings, and the control circuit controls a closing of the three-phase line circuit to apply line voltage to the first A, B, and C phase windings.

6. The pre-fluxing system as defined in claim 1, wherein the three-phase line circuit comprises a primary line circuit, the first A, B, and C phase windings comprise secondary windings, and the control circuit controls a closing of the three-phase circuit to apply line voltage to the second A, B, and C phase windings.

7. The pre-fluxing system as defined in claim 1, wherein the first A, B, and C phase windings comprise one selected from the group consisting of: a primary winding, a secondary winding, and a tertiary winding.

8. A pre-fluxing system as defined in claim 1 wherein the line breaker is closed when the prospective fluxes approach the residual fluxes of two of the magnetic core A, B, and C segments.

9. A pre-fluxing system for a three-phase transformer to reduce inrush current in the three-phase transformer having first A, B, and C phase windings in wye configuration, second A, B, and C phase windings, and a magnetic core having A, B, and C segments associated with the first and second A, B, and C phase windings, respectively, comprising:
   a three-phase line circuit including a three-phase line breaker for applying line voltage to the three-phase transformer;
   a pre-fluxing capacitor;
   a direct current source for charging the pre-fluxing capacitor;
   a charging circuit for connecting the direct current source to the pre-fluxing capacitor and charging the pre-fluxing capacitor to a predetermined voltage level;
   a pre-fluxing circuit for discharging the pre-fluxing capacitor through two first windings of the first A, B, and C phase windings; and,
   a control circuit for controlling a closing of the three-phase line circuit to apply line voltage to the three-phase transformer coincident with a positively-referenced voltage peak of a phase associated with a remaining winding of the first A, B, and C phase windings.

10. The pre-fluxing system of claim 9, wherein the pre-fluxing circuit discharges the pre-fluxing capacitor to establish residual fluxes of nearly equal magnitude and opposite polarity in two of the magnetic core A, B, and C segments associated with the two first windings.

11. The pre-fluxing system of claim 10, wherein the pre-fluxing circuit discharges the pre-fluxing capacitor to establish a reduced flux in a remaining magnetic core segment.

12. The pre-fluxing system as defined in claim 9, wherein the three-phase line circuit comprises a primary line circuit, the first A, B, and C phase windings comprise primary windings, and the control circuit controls a closing of the three-phase line circuit to apply line voltage to the first A, B, and C phase windings.

13. The pre-fluxing system as defined in claim 9, wherein the three-phase line circuit comprises a primary line circuit, the first A, B, and C phase windings comprise secondary windings, and the control circuit controls a closing of the three-phase circuit to apply line voltage to the second A, B, and C phase windings.

14. The pre-fluxing system as defined in claim 9, wherein the first A, B, and C phase windings comprise one selected from the group consisting of: a primary winding, a secondary winding, and a tertiary winding.

15. A pre-fluxing system as defined in claim 9 wherein the line breaker is closed when the prospective fluxes approach the residual fluxes of two of the magnetic core A, B, and C segments.

16. A pre-fluxing system for a three-phase transformer to reduce inrush current in the three-phase transformer having first A, B, and C phase windings in delta configuration, second A, B, and C phase windings, and a magnetic core having A, B, and C segments associated with the first and second A, B, and C phase windings, respectively, comprising:
- a three-phase line circuit including a three-phase line breaker for applying line voltage to the three-phase transformer;
- a pre-fluxing capacitor;
- a direct current source for charging the pre-fluxing capacitor;
- a charging circuit for connecting the direct current source to the pre-fluxing capacitor and charging the pre-fluxing capacitor to a predetermined voltage level;
- a pre-fluxing circuit for discharging the pre-fluxing capacitor through the first A, B, and C phase windings to establish a residual flux in each of the A, B, and C segments; and,
- a control circuit for controlling a closing of the three-phase line circuit to apply line voltage to the three-phase transformer coincident with a positively-referenced voltage peak of a phase associated with a selected segment of the A, B, and C segments.

17. The pre-fluxing system of claim 16, wherein the pre-fluxing circuit is in connection with two windings of the first A, B, and C phase windings, for discharging the pre-fluxing capacitor through a parallel combination of one of the first A, B, and C phase windings in a first branch, and the remaining two of the first A, B, and C phase windings in series in a second branch.

18. The pre-fluxing system of claim 17, wherein the first core segment is associated with the one of the first A, B, and C phase windings in the first branch.

19. The pre-fluxing system of claim 16, wherein the pre-fluxing circuit is further for discharging the pre-fluxing capacitor to establish a residual flux in a second core segment and a third core segment of the A, B, and C segments, with polarity opposite a polarity of the residual flux in the first core segment and magnitude less than a magnitude of the residual flux in the first core segment.

20. The pre-fluxing system as defined in claim 16, wherein the three-phase line circuit comprises a primary line circuit, the first A, B, and C phase windings comprise primary windings, and the control circuit controls a closing of the three-phase line circuit to apply line voltage to the first A, B, and C phase windings.

21. The pre-fluxing system as defined in claim 16, wherein the three-phase line circuit comprises a primary line circuit, the first A, B, and C phase windings comprise secondary windings, and the control circuit controls a closing of the three-phase circuit to apply line voltage to the second A, B, and C phase windings.

22. The pre-fluxing system as defined in claim 16, wherein the first A, B, and C phase windings comprise one selected from the group consisting of: a primary winding, a secondary winding, and a tertiary winding.

* * * * *